US010837209B2

United States Patent
Lin et al.

(10) Patent No.: US 10,837,209 B2
(45) Date of Patent: Nov. 17, 2020

(54) HINGE MODULE AND ELECTRONIC DEVICE

(71) Applicants: Che-Hsien Lin, Taipei (TW); Chun-An Shen, Taipei (TW); Che-Hsien Chu, Taipei (TW)

(72) Inventors: Che-Hsien Lin, Taipei (TW); Chun-An Shen, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/512,389

(22) Filed: Jul. 16, 2019

(65) Prior Publication Data

US 2020/0256099 A1 Aug. 13, 2020

(30) Foreign Application Priority Data

Feb. 13, 2019 (TW) .............................. 108104844 A

(51) Int. Cl.
*E05D 3/06* (2006.01)
*E05D 3/14* (2006.01)
(Continued)

(52) U.S. Cl.
CPC ................. *E05D 3/14* (2013.01); *E05D 3/18* (2013.01); *E05D 7/0009* (2013.01); *E05D 11/06* (2013.01);
(Continued)

(58) Field of Classification Search
CPC ........... E05D 3/14; E05D 3/18; E05D 7/0009; E05D 11/06
See application file for complete search history.

(56) References Cited

U.S. PATENT DOCUMENTS 1,987,516 A * 1/1935 Peremi .................... E05D 15/28
16/240
2,206,708 A * 7/1940 Stumpf ..................... E05D 3/06
16/358
(Continued)

FOREIGN PATENT DOCUMENTS

TW M529774 10/2016

OTHER PUBLICATIONS

"Office Action of Taiwan Counterpart Application," dated Nov. 25, 2019, p. 1-p. 8.

*Primary Examiner* — Jason W San
(74) *Attorney, Agent, or Firm* — JCIPRNET

(57) ABSTRACT

A hinge module includes a first bracket, a second bracket, a pivot assembly, a pressing component and an adjusting structure. The first bracket has at least one first sliding slot. The first bracket and the second bracket are pivoted to each other by the pivot assembly, wherein the pivot assembly has a first sliding portion that is slidably disposed in the first sliding slot. The pressing component is connected to the first bracket and the first sliding portion. The adjusting structure is connected to the pressing component that presses the first sliding portion by the adjusting structure. When the first bracket and the second bracket rotate relative to each other, the first sliding portion slides along the first sliding slot, and the hinge module generates a torsional force by continuously pressing the first sliding portion by the pressing component. In addition, an electronic device including the hinge module is provided.

16 Claims, 7 Drawing Sheets

(51) Int. Cl.
*G06F 1/16* (2006.01)
*E05D 3/18* (2006.01)
*E05D 11/06* (2006.01)
*E05D 7/00* (2006.01)

(52) U.S. Cl.
CPC .......... *G06F 1/1616* (2013.01); *G06F 1/1681* (2013.01); *E05Y 2900/606* (2013.01)

(56) References Cited

U.S. PATENT DOCUMENTS

| | | | | |
|---|---|---|---|---|
| 3,673,635 | A * | 7/1972 | Cencioni | E05D 3/06 16/358 |
| 3,978,549 | A * | 9/1976 | Vitt | E05D 3/183 16/245 |
| 4,736,491 | A * | 4/1988 | Mertes | E05D 3/18 16/358 |
| 6,659,559 | B1 * | 12/2003 | Metzler | B60N 2/20 297/378.12 |
| 8,201,306 | B2 * | 6/2012 | Kim | E05F 1/1215 16/360 |
| 8,300,394 | B2 * | 10/2012 | Senatori | G06F 1/1616 361/679.27 |
| 8,732,908 | B2 | 5/2014 | Hatano | |
| 9,624,704 | B1 * | 4/2017 | Hsu | E05D 5/10 |
| 9,834,965 | B1 * | 12/2017 | Yao | E05D 5/04 |
| 2016/0320811 | A1 * | 11/2016 | Lin | G06F 1/1681 |
| 2018/0058123 | A1 * | 3/2018 | Salice | E05F 5/02 |

* cited by examiner

HINGE MODULE AND ELECTRONIC DEVICE

CROSS-REFERENCE TO RELATED APPLICATION

This application claims the priority benefit of Taiwan application serial no. 108104844, filed on Feb. 13, 2019. The entirety of the above-mentioned patent application is hereby incorporated by reference herein and made a part of this specification.

BACKGROUND OF THE INVENTION

Technical Field

The disclosure relates to a connecting structure and an electronic device, and more particularly, to a hinge module and an electronic device to which the hinge module applies.

Description of Related Art

Thanks to advances in semiconductor devices and the technologies of display devices, electronic devices are being continuously developed into small-size, multifunctional and portable products. Common portable electronic devices include a tablet computer (tablet PC), a smartphone, a notebook computer and the like. For example, the notebook computer comprises mainly of a host and a screen pivoted to each other. The user may fold a notebook computer shut through the relative rotation of a host and a screen for easy transportation, and open up the screen when intending to use the notebook computer.

Generally speaking, a hinge module is disposed between the host and screen of a notebook computer such that the notebook computer is open or shut as the host and screen are adapted to rotate relative to each other by the hinge module. During the process that the user opens the screen in a display host, the hinge module requires a torsional force that is small enough to allow the user to open the screen to the desired position easily. After the screen is opened to be in the desired position, the hinge module requires a torsional force that is large enough to prevent the screen from vibrating unexpectedly. The amount of the torsional force provided by the hinge module is usually fixed, and therefore it is difficult to meet the demand for both of the above convenience of operation and structural stability.

SUMMARY OF THE INVENTION

The disclosure provides a hinge module that can have both the convenience of operation and structural stability.

The hinge module according to the disclosure includes a first bracket, a second bracket, a pivot assembly, a pressing component and an adjusting structure. The first bracket has at least one first sliding slot. The first bracket and the second bracket are pivoted to each other by the pivot assembly, and the pivot assembly has a first sliding portion slidably disposed in the first sliding slot. The pressing component is connected to the first bracket and the first sliding portion. The adjusting structure is connected to the pressing component, wherein the pressing component presses the first sliding portion by the adjusting structure. When the first bracket and the second bracket rotate relative to each other, the first sliding portion slides along the first sliding slot, and the hinge module generates a torsional force by continuously pressing the first sliding portion by the pressing component.

The electronic device according to the disclosure includes a first body, a second body and at least one hinge module. The hinge module includes a first bracket, a second bracket, a pivot assembly, a pressing component and an adjusting structure. The first bracket and the second bracket are connected to the first body and the second body respectively. The first bracket has at least one first sliding slot. The first bracket and the second bracket are pivoted to each other by the pivot assembly, and the pivot assembly has a first sliding portion slidably disposed in the first sliding slot. The pressing component is connected to the first bracket and the first sliding portion. The adjusting structure is connected to the pressing component, wherein the pressing component presses the first sliding portion by the adjusting structure. When the first bracket and the second bracket rotate relative to each other, the first sliding portion slides along the first sliding slot, and the hinge module generates a torsional force by continuously pressing the first sliding portion by the pressing component.

According to an embodiment of the disclosure, the adjusting structure includes a lock assembly, wherein the lock assembly locks an end of the pressing component on the first bracket, and the pressing component presses the first sliding portion by a locking force of the lock assembly.

According to an embodiment of the disclosure, the locking force of the lock assembly is adjustable to change the torsional force of the hinge module.

According to an embodiment of the disclosure, the first sliding portion is adapted to slide from a first position in the first sliding slot to a second position in the first sliding slot with the first bracket and the second bracket unfolded relative to each other, wherein the second position is located between the lock assembly and the first position.

According to an embodiment of the disclosure, the lock assembly provides the locking force along a locking direction, wherein the locking direction is perpendicular to an extending direction of the first sliding slot.

According to an embodiment of the disclosure, the second bracket includes at least one second sliding slot, the pivot assembly includes a second sliding portion, the second sliding portion is slidably disposed in the second sliding slot, and when the first bracket and the second bracket rotate relative to each other, the second sliding portion slides along the second sliding slot.

According to an embodiment of the disclosure, the pivot assembly includes at least one first connecting rod and at least one second connecting rod, the first connecting rod is pivoted to the second connecting rod and the second bracket, the second connecting rod is pivoted to the first bracket, the first sliding portion is connected to the first connecting rod, and the second sliding portion is connected to the second connecting rod.

According to an embodiment of the disclosure, the first sliding portion is rotatably connected to the first connecting rod, and the second sliding portion is rotatably connected to the second connecting rod.

According to an embodiment of the disclosure, a pivot axial direction of the first connecting rod and the second connecting rod, a pivot axial direction of the first connecting rod and the second bracket, and a pivot axial direction of the second connecting rod and the first bracket are parallel to each other.

According to an embodiment of the disclosure, the pivot assembly includes a first shaft and a second shaft, wherein the first connecting rod is pivoted to the second bracket by the first shaft, the second connecting rod is pivoted to the first bracket by the second shaft, an end of the pressing component is connected to the first bracket, and the other end of the pressing component is connected to the second shaft.

In view of the foregoing, in the hinge module according to the disclosure, the first sliding portion of the pivot assembly slides along the first sliding slot of the first bracket with the first bracket and the second bracket rotating relative to each other. In this way, different pressing forces can be applied to the first sliding portion through different positions of the pressing component in the moving path of the first sliding portion, such that the torsional force provided by the hinge module is not a constant value and the effects of both the convenience of operation and structural stability are achieved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
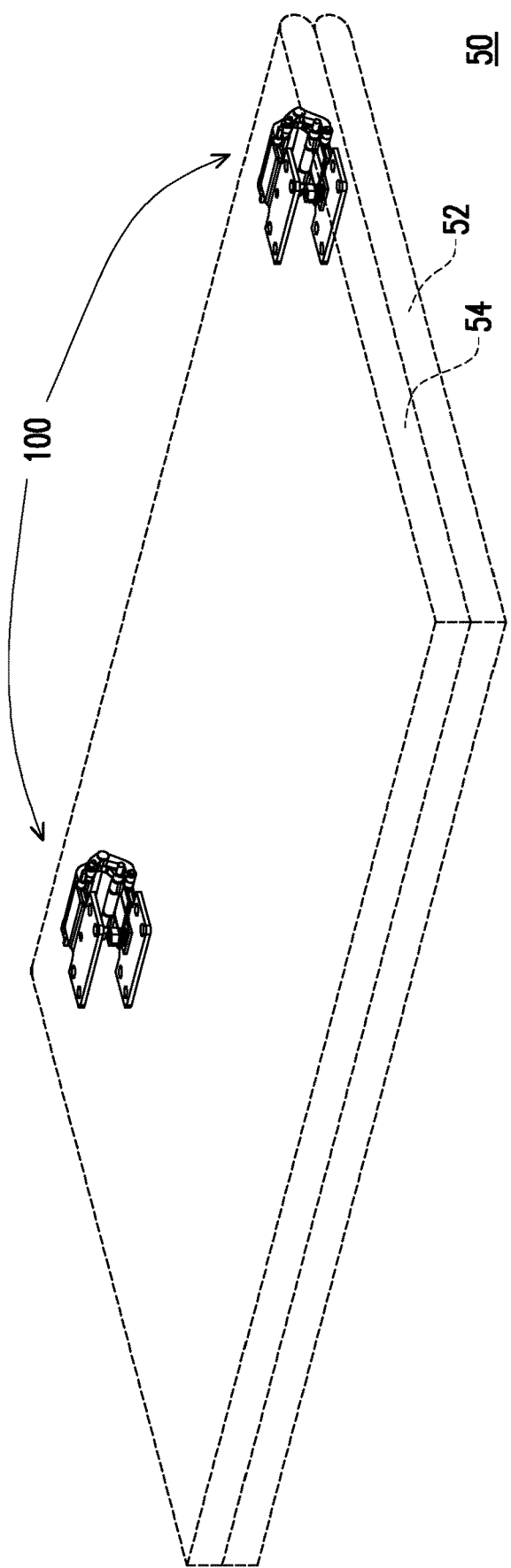
FIG. 1 is a perspective view of an electronic device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a perspective view of an electronic device according to an embodiment of the disclosure. Referring to FIG. 1, an electronic device 50 according to the embodiment is, for example, a notebook computer and includes a first body 52, a second body 54 and at least one hinge module 100 (two hinge modules are shown). The first body 52 and the second body 54 are, for example, the host and screen of a notebook computer respectively and are pivoted to each other by the hinge module 100.

Figure 2:
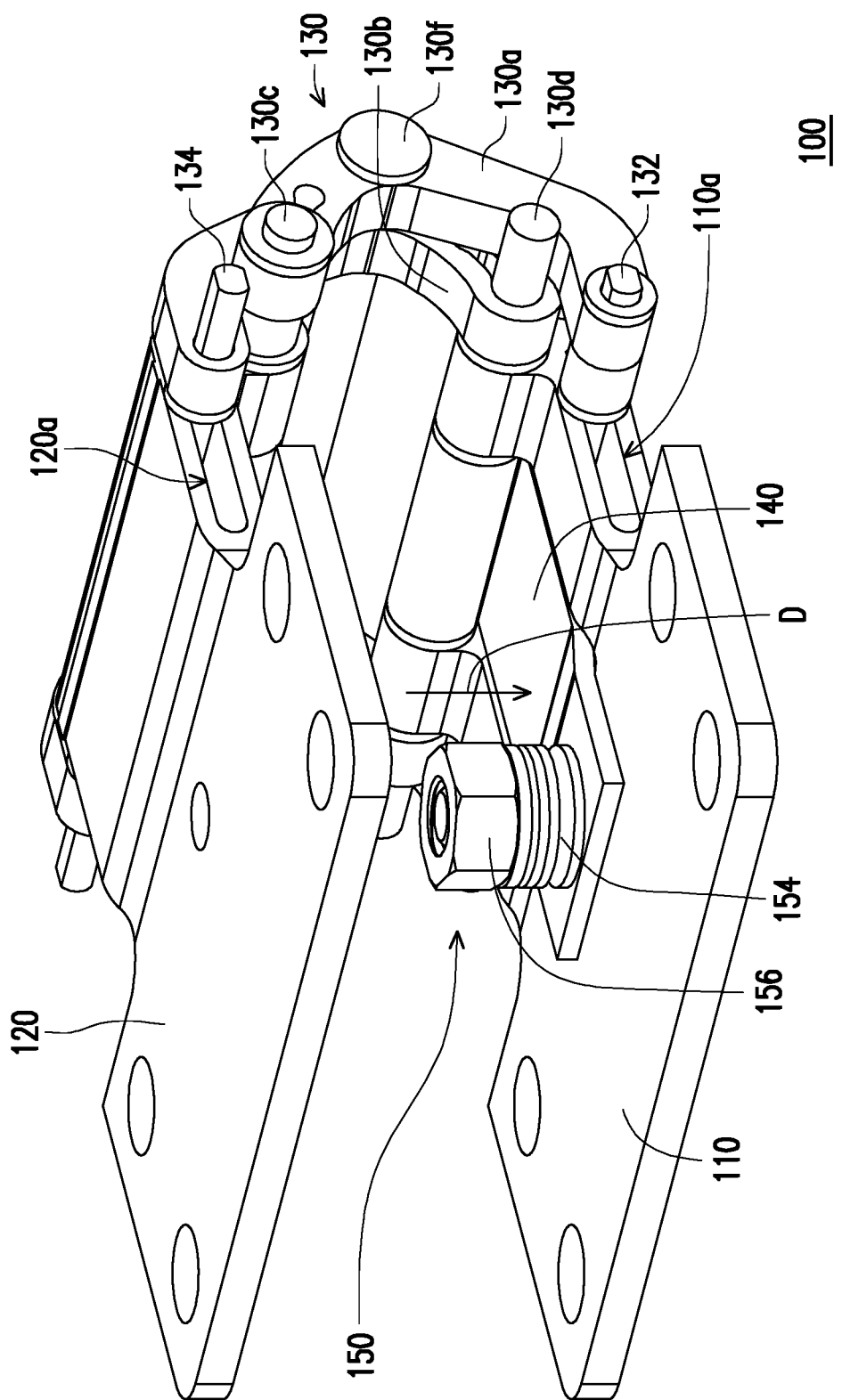
FIG. 2 is a perspective view of a hinge module of FIG. 1.
Figure 3:
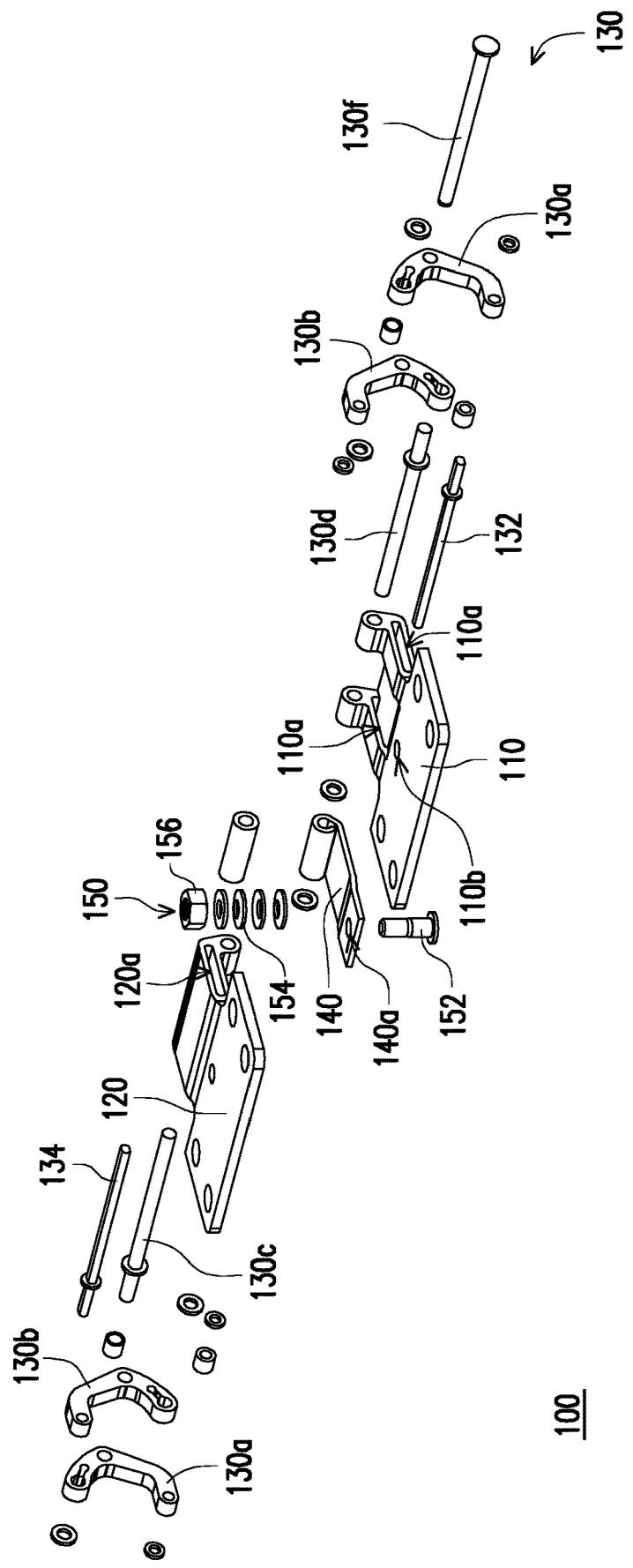
FIG. 3 is an exploded view of the hinge module of FIG. 1.

FIG. 2 is a perspective view of the hinge module of FIG. 1. FIG. 3 is an exploded view of the hinge module of FIG. 1. Referring to FIGS. 2 and 3, the hinge module 100 according to the embodiment includes a first bracket 110, a second bracket 120, a pivot assembly 130 and a pressing component 140. The first bracket 110 and the second bracket 120 are connected to the first body 52 and the second body 54 shown in FIG. 1 respectively. The first bracket 110 and the second bracket 120 are pivoted to each other by the pivot assembly 130. The first bracket 110 includes at least one first sliding slot 110a (two first sliding slots are shown in FIG. 3), and the second bracket 120 includes at least one second sliding slot 120a (a second sliding slot is shown in FIGS. 2 and 3 each). The pivot assembly 130 includes a first sliding portion 132 and a second sliding portion 134. The first sliding portion 132 is, for example, a rod and is slidably disposed in the first sliding slot 110a, and the second sliding portion 134 is, for example, a rod and is slidably disposed in the second sliding slot 120a. The pressing component 140 is, for example, a shrapnel and is connected to the first bracket 110 and the first sliding portion 132.

Figure 4A:
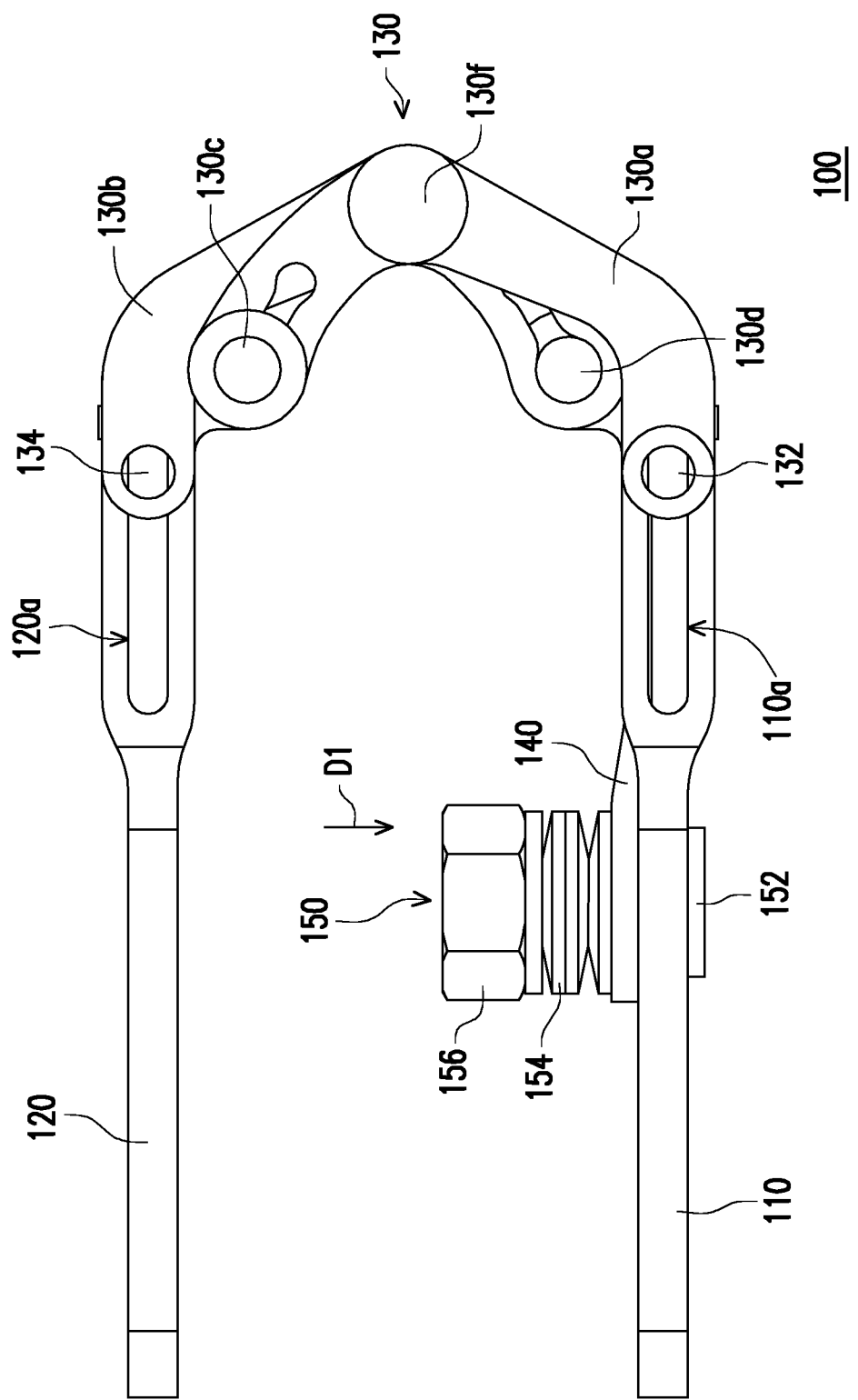
FIGS. 4A to 4C illustrate that a first bracket and a second bracket of FIG. 2 rotate relative to each other.
Figure 4B:
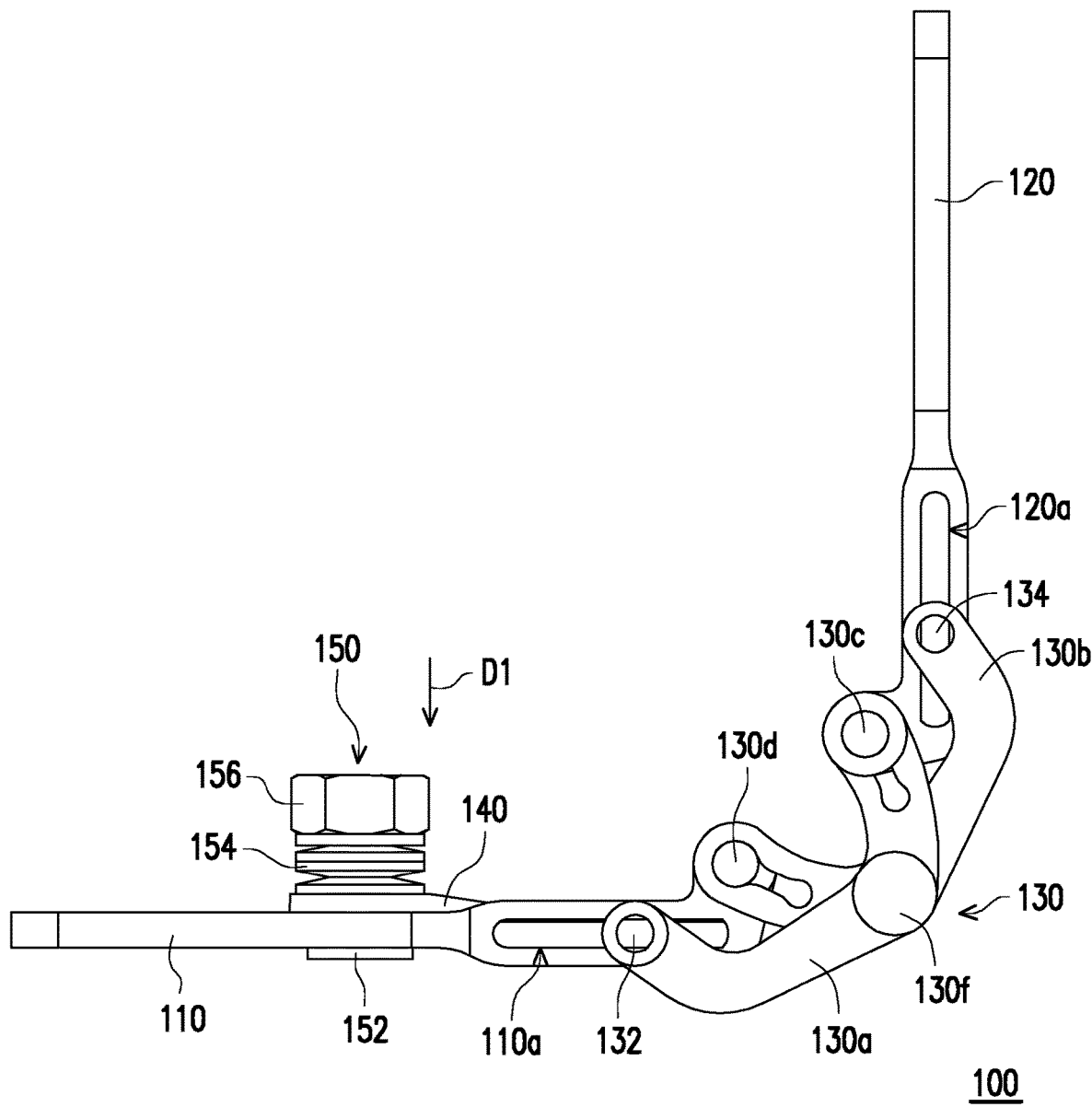
Figure 4C:
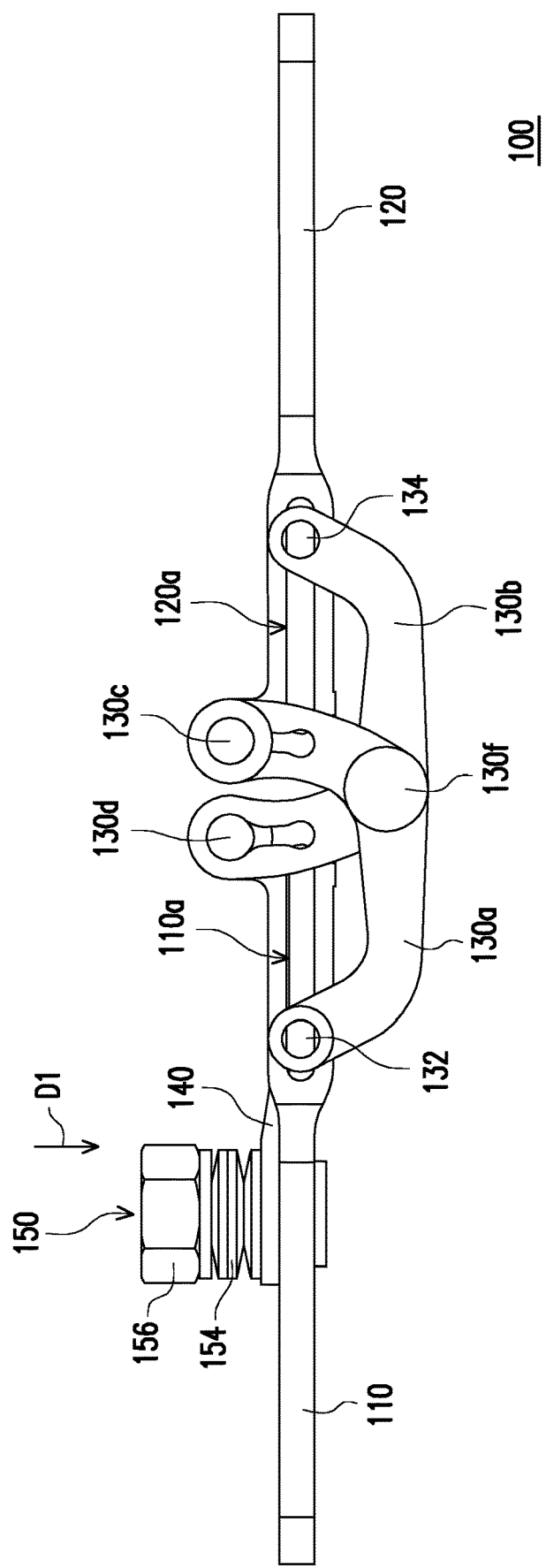

FIGS. 4A to 4C illustrate that the first bracket and the second bracket of FIG. 2 rotate relative to each other. When the first bracket 110 and the second bracket 120 rotate relative to each other, as shown in FIGS. 4A to 4C, the first sliding portion 132 and the second sliding portion 134 slide along the first sliding slot 110a and the second sliding slot 120a, and the hinge module 100 generates a torsional force by continuously pressing the first sliding portion 132 by the pressing component 140. Under the configuration, different pressing forces can be applied to the first sliding portion 132 through different positions of the pressing component 140 in the moving path of the first sliding portion 132, such that the torsional force provided by the hinge module 100 is not a constant value and the effects of both the convenience of operation and structural stability are achieved. The details are presented below.

The hinge module 100 according to the embodiment can include an adjusting structure connected to the pressing component 140. The pressing component 140 presses the first sliding portion 132 by the adjusting structure. Specifically, the adjusting structure is, for example, a lock assembly 150 that locks an end of the pressing component 140 on the first bracket 110 to allow the pressing component 140 to press the first sliding portion 132 by a locking force of the lock assembly 150. The lock assembly 150, for example, provides the locking force along a locking direction D that is perpendicular to an extending direction of the first sliding slot 110a such that the pressing component 140 generates the pressing force applied to the first sliding portion 132.

Figure 5:
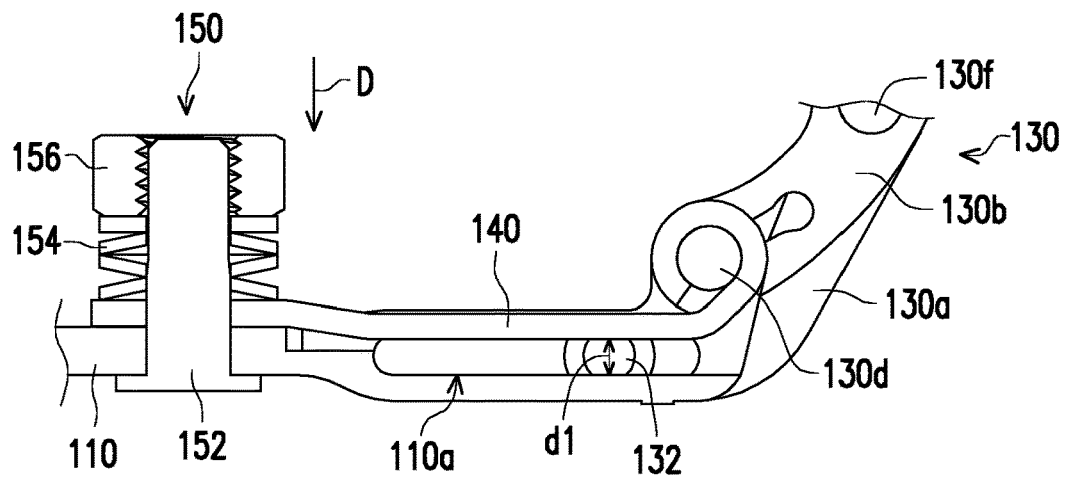
FIG. 5 is a partial sectional view of a hinge module of FIG. 4A.
Figure 6:
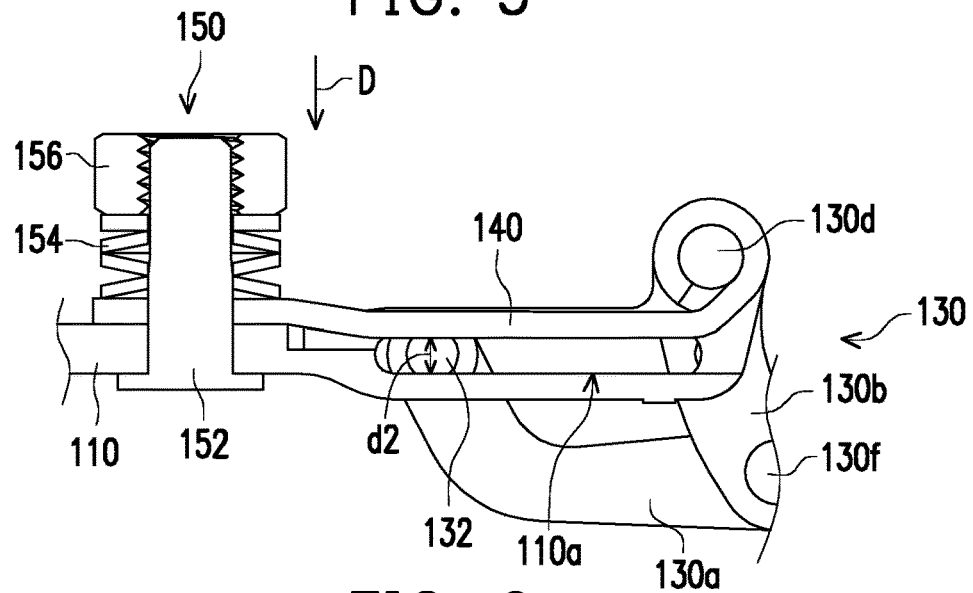
FIG. 6 is a partial sectional view of a hinge module of FIG. 4C.

FIG. 5 is a partial sectional view of the hinge module of FIG. 4A. FIG. 6 is a partial sectional view of the hinge module of FIG. 4C. As shown in FIGS. 5 and 6, an end of the pressing component 140 (a left end of the pressing component 140 in FIGS. 5 and 6) is pressed by the lock assembly 150. Therefore, the closer the end of the pressing component 140 (the left end of the pressing component 140 in FIGS. 5 and 6) it is, the shorter the distance between the pressing component 140 and a bottom wall of the first sliding slot 110a becomes. Further, the larger the pressing force applied to the first sliding portion 132 by the pressing component 140 becomes, the larger the generated torsional force becomes.

Specifically, the first sliding portion 132 is adapted to slide from a first position (the position shown in FIGS. 4A and 5) in the first sliding slot 110a to a second position (the position shown in FIGS. 4C and 6) in the first sliding slot 110a with the first bracket 110 and the second bracket 120 unfolded relative to each other, wherein the second position is located between the lock assembly 150 and the first position. That is, when the first bracket 110 and the second bracket 120 are shut, as shown in FIG. 4A, the first sliding portion 132 is located in a position far away from the lock assembly 150. The larger distance d1 is provided between the pressing component 140 in this position and the bottom wall of the first sliding slot 110a. At this time, as the lock assembly 150 applies a smaller pressing force to the first sliding portion 132 via the pressing component 140, the hinge module 100 generates smaller torsional force. When the first bracket 110 and the second bracket 120 operates from being shut as shown in FIG. 4A to being opened as shown in FIG. 4C, the first sliding portion 132 is becoming closer to the pivot assembly 150, and the smaller distance d2 is provided between the pressing component 140 in this position and the bottom wall of the first sliding slot 110a. At this time, as the pressing force applied to the first sliding portion 132 by the lock assembly 150 via the pressing component 140 gradually increases, the torsional force of the hinge module 100 increases.

Accordingly, in a case where the hinge module 100 shown in FIG. 4A generates smaller torsional force, the user may unfold the second body 54 (shown in FIG. 1) and the second bracket 120 relative to the first body 52 (shown in FIG. 1) and the first bracket 110 easily. Moreover, during the process that the second bracket 120 is unfolded relative to the first bracket 110, the torsional force of the hinge module 100 gradually increases such that the second body 54 can be prevented from vibrating unexpectedly. Thus, the effects of both the convenience of operation and structural stability are achievable.

The lock assembly 150 according to the embodiment includes a stud 152, a plurality of elastic washers 154 and a nut 156. The stud 152 is placed into a locking hole 110b (shown in FIG. 3) of the first bracket 110 and a locking hole 140a (shown in FIG. 3) of the pressing component 140. The elastic washers 154 are inserted into the stud 152, and the nut 156 is threaded fully on the stud 152 to press the pressing component 140 by the elastic washers 154.

Figure 7:
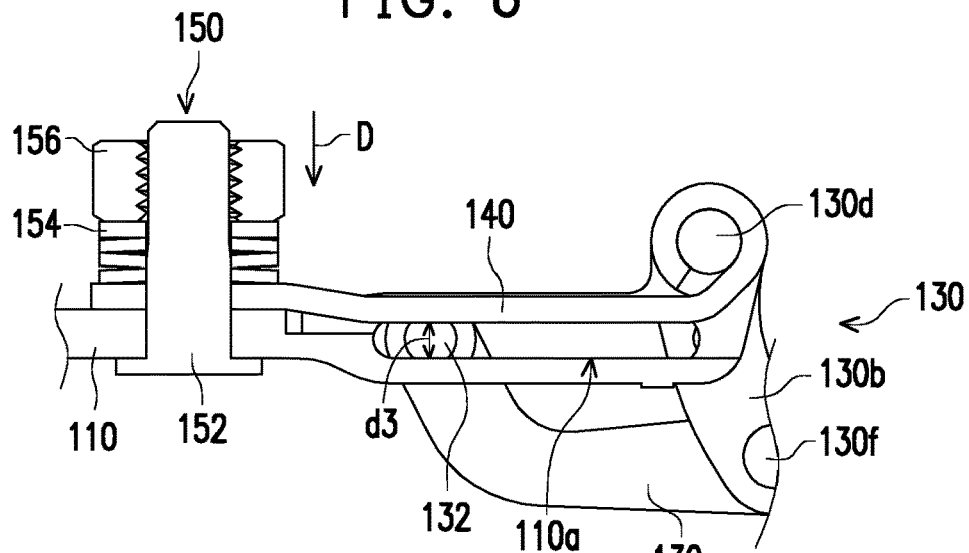
FIG. 7 illustrates that a nut of FIG. 6 is driven downward.

FIG. 7 illustrates that the nut of FIG. 6 is driven downward. In the present embodiment, by driving the nut 156 downward more tightly, as shown in FIG. 7, the locking force of the lock assembly 150 can be adjusted to become larger, and in this way the distance d2 shown in FIG. 6 between the pressing component 140 and the bottom wall of the first sliding slot 110a shrinks to distance d3 shown in FIG. 7 to change the torsional force of the hinge module 100 to become larger. By making the adjustment, the torsional force of the hinge module 100 can be corrected to make the second body 54 more user-friendly when the user opens up or shuts the second body 54. In other embodiments, the lock assembly 150 can come in other appropriate forms, and the locking force of the lock assembly 150 is adjustable by other proper structures and ways. The disclosure is not limited thereto.

Below are the details of the structure and connecting way of the pivot assembly 130 according to the embodiment of the disclosure. The pivot assembly 130 according to the embodiment includes at least one first connecting rod 130a (two first connecting rods are shown in FIG. 3), at least one second connecting rod 130b (two second connecting rods are shown in FIG. 3), a first shaft 130c, a second shaft 130d and a third shaft 130f. The first connecting rod 130a is pivoted to the second bracket 120 by the first shaft 130c, the second connecting rod 130b is pivoted to the first bracket 110 by the second shaft 130d, and the first connecting rod 130a and the second connecting rod 130b are pivoted to each other by the third shaft 130f. A pivot axial direction of the first connecting rod 130a and the second connecting rod 130b, a pivot axial direction of the first connecting rod 130a and the second bracket 120, and a pivot axial direction of the second connecting rod 130b and the first bracket 110 are parallel to each other. The first sliding portion 132 is rotatably connected to the first connecting rod 130a, and the second sliding portion 134 is rotatably connected to the second connecting rod 130b. An end of the pressing component 140 (the left end of the pressing component 140 in FIGS. 5 and 6) is connected to the first bracket 110, as mentioned above, and the other end of the pressing component 140 (the right end of the pressing component 140 in FIGS. 5 and 6) is connected to the second shaft 130d. Through the connection of the above components of the pivot assembly 130, the pivot assembly 130 can operate as shown in FIGS. 4A to 4C.

In view of the foregoing, in the hinge module according to the disclosure, the first sliding portion of the pivot assembly slides along the first sliding slot of the first bracket with the first bracket and the second bracket rotating relative to each other. In this way, different pressing forces can be applied to the first sliding portion through different positions of the pressing component in the moving path of the first sliding portion, such that the torsional force provided by the hinge module is not a constant value and the effects of both the convenience of operation and structural stability are achieved. In addition, the locking force applied to the pressing component by the lock assembly is adjustable to change the pressing force applied to the first sliding portion by the pressing component. In this way, the torsional force of the hinge module is corrected to make the second body more user-friendly when the user opens up or shuts the second body.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge module, comprising: a first bracket and a second bracket, wherein the first bracket has at least one first sliding slot;

a pivot assembly, wherein the first bracket and the second bracket are pivoted to each other by the pivot assembly, and the pivot assembly has a first sliding portion slidably disposed in the first sliding slot;

a pressing component connected to the first bracket and the first sliding portion; and an adjusting structure connected to the pressing component, wherein the pressing component presses the first sliding portion by the adjusting structure, wherein when the first bracket and the second bracket rotate relative to each other, the first sliding portion slides along the first sliding slot, and the hinge module generates a torsional force by continuously pressing the first sliding portion by the pressing component;

wherein the adjusting structure comprises a lock assembly, wherein the lock assembly locks an end of the pressing component on the first bracket, and the pressing component presses the first sliding portion by a locking force of the lock assembly; and wherein the locking force of the lock assembly is adjustable to change the torsional force of the hinge module.

2. The hinge module of claim 1, wherein the first sliding portion is adapted to slide from a first position n the first sliding slot to a second position in the first sliding slot with the first bracket and the second bracket unfolded relative to each other, wherein the second position is located between the lock assembly and the first position.

3. The hinge module of claim 1, wherein the lock assembly provides the locking force along a locking direction, wherein the locking direction is perpendicular to an extending direction of the first sliding slot.

4. The hinge module of claim 1, wherein the second bracket comprises at least one second sliding slot, the pivot assembly comprises a second sliding portion, the second sliding portion is slidably disposed in the second sliding slot, and when the first bracket and the second bracket rotate relative to each other, the second sliding portion slides along the second sliding slot.

5. The hinge module of claim 4, wherein the pivot assembly comprises at least one first connecting rod and at least one second connecting rod, the first connecting rod and the second connecting rod are pivoted to each other, the first connecting rod is pivoted to the second bracket, the second connecting rod is pivoted to the first bracket, the first sliding portion is connected to the first connecting rod, and the second sliding portion is connected to second connecting rod.

6. The hinge module of claim 5, wherein the first sliding portion is rotatably connected to the first connecting rod, and the second sliding portion is rotatably connected to the second connecting rod.

7. The hinge module of claim 5, wherein a pivot axial direction of the first connecting rod and the second connecting rod, a pivot axial direction of the first connecting rod and the second bracket, and a pivot axial direction of the second connecting rod and the first bracket are parallel to each other.

8. The hinge module of claim 5, wherein the pivot assembly comprises a first shaft and a second shaft, wherein the first connecting rod is pivoted to the second bracket by the first shaft, the second connecting rod is pivoted to the first bracket by the second shaft, an end of the pressing component is connected to the first bracket, and the other end of the pressing component is connected to the second shaft.

9. An electronic device, comprising:
a first body and a second body; and
at least one hinge module, comprising:
a first bracket and a second bracket connected to the first body and the second body respectively, wherein the first bracket includes at least one first sliding slot;
a pivot assembly, wherein the first bracket and the second bracket are pivoted to each other by the pivot assembly, and the pivot assembly has a first sliding portion slidably disposed in the first sliding slot;
a pressing component connected to the first bracket and the first sliding portion; and
an adjusting structure connected to the pressing component, wherein the pressing component presses the first sliding portion by the adjusting structure,
wherein when the first bracket and the second bracket rotate relative to each other, the first sliding portion slides along the first sliding slot, and the hinge module generates a torsional force by continuously pressing the first sliding portion by the pressing component;
wherein the adjusting structure comprises a lock assembly, wherein the lock assembly locks an end of the pressing component on the first bracket, and the pressing component presses the first sliding portion by a locking force of the lock assembly; and
wherein the locking force of the locking assembly is adjustable to change the torsional force of the hinge module.

10. The electronic device of claim 9, wherein the first sliding portion is adapted to slide from a first position in the first sliding slot to a second position in the first sliding slot with the first bracket and the second bracket unfolded relative to each other, wherein the second position is located between the lock assembly and the first position.

11. The electronic device of claim 9, wherein the lock assembly provides the locking force along a locking direction, wherein the locking direction is perpendicular to an extending direction of the first sliding slot.

12. The electronic device of claim 9, wherein the second bracket comprises at least second sliding slot, the pivot assembly comprises a second sliding portion, the second sliding portion is slidably disposed in the second sliding slot, and when the first bracket and the second bracket rotate relative to each other, the second sliding portion slides along the second sliding slot.

13. The electronic device of claim 12, wherein the pivot assembly comprises at least one first connecting rod and at least one second connecting rod, the first connecting rod is pivoted to the second connecting rod and the second bracket, the second connecting rod is pivoted to the first bracket, the first sliding portion is connected to the first connecting rod, and the second sliding portion is connected to the second connecting rod.

14. The electronic device of claim 13, wherein the first sliding portion is rotatably connected to the first connecting rod, and the second sliding portion is rotatably connected to the second connecting rod.

15. The electronic device of claim 13, wherein a pivot axial direction of the first connecting rod and the second connecting rod, a pivot axial direction of the first connecting rod and the second bracket, and a pivot axial direction of the second connecting rod and the first bracket are parallel to each other.

16. The electronic device of claim 13, wherein the pivot assembly comprises a first shaft and a second shaft, wherein the first connecting rod is pivoted to the second bracket by the first shaft, the second connecting rod is pivoted to the first bracket by the second shaft, an end of the pressing component is connected to the first bracket, and the other end of the pressing component is connected to the second shaft.

* * * * *